Jan. 3, 1967  L. W. HAAKER  3,295,702
MANIPULATOR MOTION LOCK
Original Filed Aug. 12, 1963  3 Sheets-Sheet 1
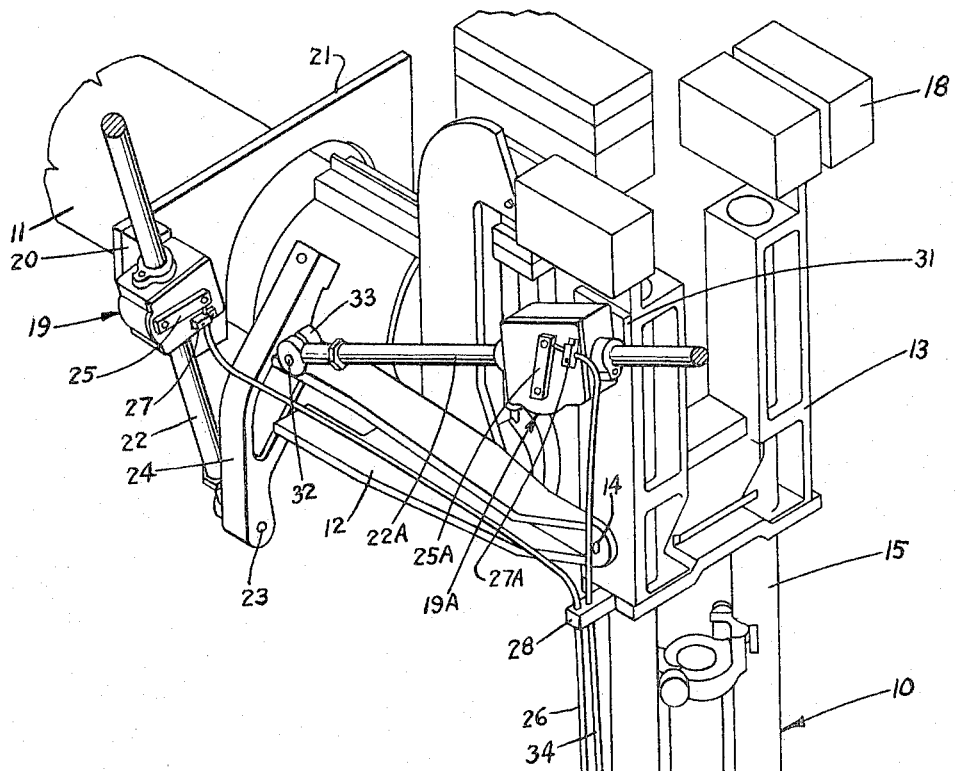
FIG. 1
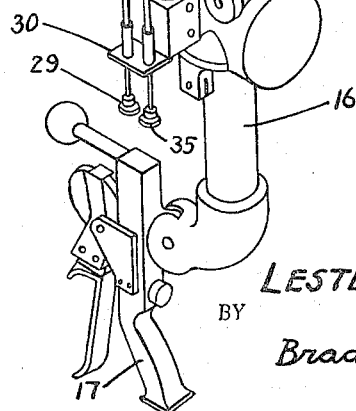
INVENTOR.
LESTER W. HAAKER
BY
Braddock & Burd
ATTORNEYS Jan. 3, 1967  L. W. HAAKER  3,295,702

MANIPULATOR MOTION LOCK

Original Filed Aug. 12, 1963  3 Sheets-Sheet 2

INVENTOR.
LESTER W. HAAKER
BY
Braddock+Burd
ATTORNEYS

Jan. 3, 1967    L. W. HAAKER    3,295,702
MANIPULATOR MOTION LOCK
Original Filed Aug. 12, 1963    3 Sheets-Sheet 3

INVENTOR.
LESTER W. HAAKER
BY
Braddock & Burd
ATTORNEYS

United States Patent Office 3,295,702
Patented Jan. 3, 1967

3,295,702
MANIPULATOR MOTION LOCK
Lester W. Haaker, Red Wing, Minn., assignor to Central Research Laboratories, Inc., Red Wing, Minn., a corporation of Minnesota
Original application Aug. 12, 1963, Ser. No. 301,571. Divided and this application July 13, 1965, Ser. No. 483,386
7 Claims. (Cl. 214—1)

This is a division of application Serial Number 301,571 filed August 12, 1963.

This invention relates to mechanical manually operated remote control master-slave manipulators of the type by which movements of a handle engaged by an operator on one side of a barrier wall are reproduced in a tong or grasper means engaging an article to be manipulated on the other side of the barrier wall. More particularly, this invention relates to master-slave manipulators of the type described which are provided with motion lock means for the purpose of securing the manipulator in some intermediate position in order to relieve the operator of the necessity of physically holding the manipulator in the desired position.

Exemplary master-slave manipulators of the type with which the motion lock means of the present invention is adapted for use are shown in Jelatis Patent 2,771,199, granted November 20, 1956, and the copending application Serial No. 158,396 of Jelatis et al., filed December 11, 1961, and now Patent No. 3,139,990, granted July 7, 1964.

Unless otherwise restrained, manipulators of this type, when released from the grasp of the operator, tend to assume a neutral or at-rest position in which the master and slave arms tend to be aligned vertically.

Situations often arise in the course of use of such manipulators where the manipulator arms remain in a more or less stationary position while the operator performs the manipulative operations largely by manipulation of the handle means at the end of the master arm of the manipulator. When such situations occur, it is fatiguing for the operator to have to maintain the master and slave arms in the required position while at the same time performing the more intricate manipulations with the handle means.

The present invention is directed to manipulator motion lock means to permit the operator to lock the manipulator arms in any desired position of the X motion and/or the Y motion in order to free him from the fatigue of holding the arms in position manually. As used in this art, X motion refers to the movement of the manipulator arms from side to side about a pivot whose axis extends through the barrier wall. Y motion is the movement of the arms toward and away from the barrier wall about pivots whose axes are generally parallel to the barrier wall.

The invention is illustrated in the drawings in which the same numerals are used to designate corresponding parts and in which:

FIGURE 1 is a simplified perspective view of the master arm end of a remote control master slave manipulator fitted with motion locks for securing the arm against movement in the X motion and Y motion;

Figure 3:
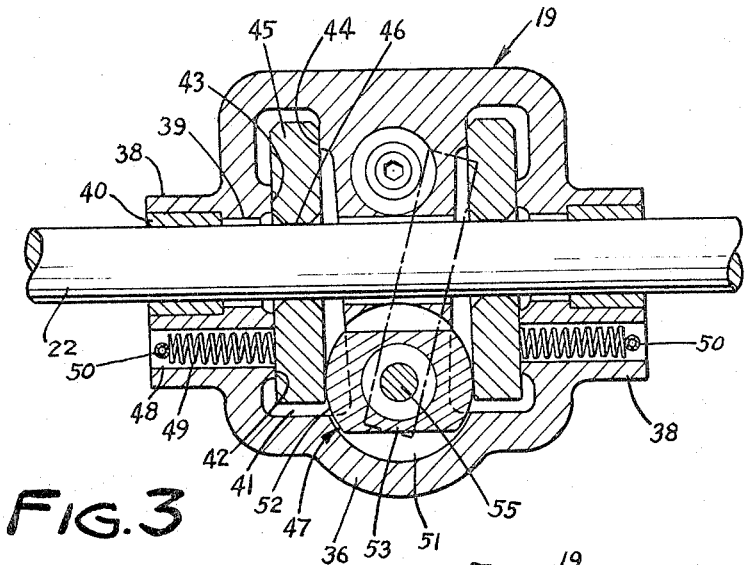
FIGURE 3 is a front elevation similar to FIGURE 2, but in section.
Figure 2:
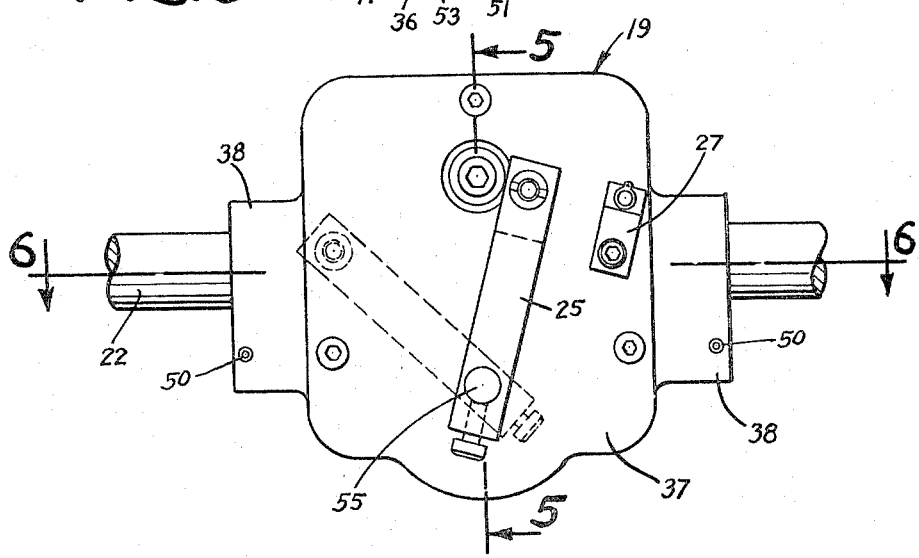
FIGURE 2 is a front elevation of a motion lock box assembly.
Figure 4:
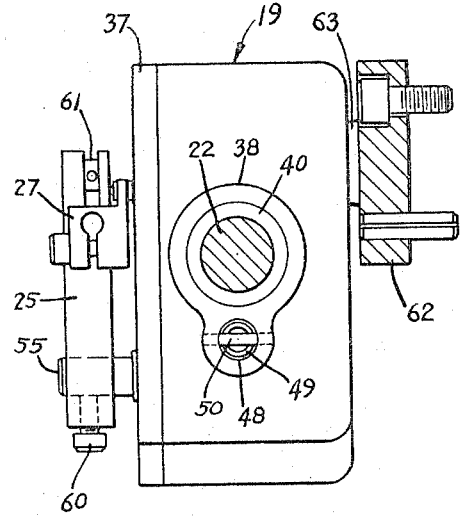
FIGURE 4 is an end elevation of the lock box assembly of FIGURE 2.
Figure 5:
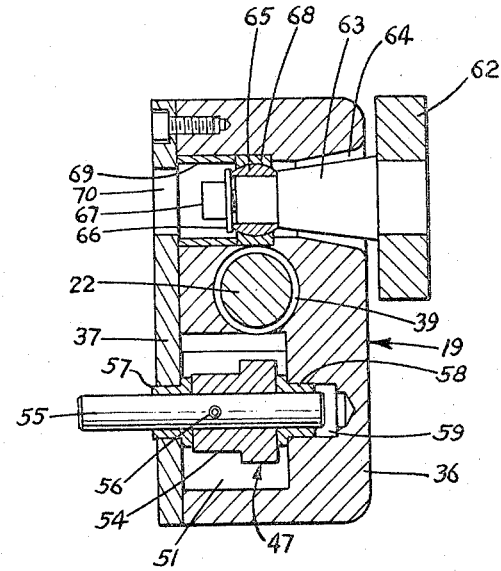
FIGURE 5 is a vertical section on the line 5—5 of FIGURE 2 and in the direction of the arrows.
Figure 6:
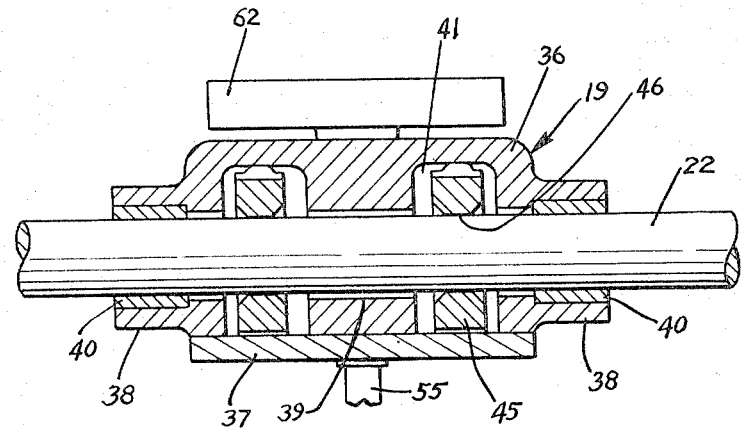
FIGURE 6 is a horizontal section on the line 6—6 of FIGURE 2 and in the direction of the arrows but with the fittings of the face of the box not shown.

Referring to FIGURE 1, there is shown the master arm end of a remote control master-slave manipulator 10 which includes a horizontal tubular support 11 which is adapted to extend through a barrier wall separating the operator from the material with which he is working. The manipulator pivots in its X motion about the longitudinal axis of tubular support 11. A bifurcated bracket or frame 12 is secured to one end of tubular support 11 for rotation therewith.

A further frame 13 is pivotally supported at 14 between the arms of frame 12 by means of suitable stub shafts and bearings. A pair of relatively stationary trunk tube members 15 are suspended from the supporting frame 13. A relatively movable boom tube 16 carrying handle means 17 at its lower end is supported between the trunk tube members 15 for longitudinal movement relative thereto.

The manner in which the manipulator performs its manipulative functions is fully described in the aforementioned patent and application and as such form no part of the present invention. The master arm is balanced by means of counterweights 18. The entire master arm assembly pivots relative to the tubular support in the Y motion about the axes of pivots 14.

The manipulator is locked against X motion by means of a cam actuated motion lock box, indicated generally at 19, which is pivotally mounted on a bracket 20 which is secured to a plate 21 adapted to be fixed to the barrier wall. An elongated locking arm or rod 22 extends through the motion lock box 19 for relative reciprocal or longitudinal motion. One end of locking arm or rod 22 is secured at 23 for limited pivotal movement relative to an arm 24 which is secured to the bifurcated frame 12. The axis of pivot 23 is generally parallel to the axis of horizontal tubular support 11.

Arm 24 is fixed to frame 12 which is rotatable along with tubular support 11. Lock box 19 is stationary relative to that pivotal movement, being secured to fixed plate 21. Locking arm 22 is pivotally attached to arm 24 and free to slide longitudinally through lock box 19 when the manipulator master arm is moved through its X motion.

As described in detail hereinafter, the master arm may be locked in any position by actuating the cam of the lock box to cause the lock box to grip arm 22 to prevent its sliding movement through the lock box. When the locking arm is thus gripped, through its pivotal link with arm 24, it holds that arm and frame 12 and the entire master arm structure supported by that frame in locked position.

The lock box is actuated through a crank arm or lever 25 by means of a push-pull cable control 26 which extends from the crank arm or lever through a clamping guide 27 on the lock box, and a guide bracket 28 secured to the supporting frame 13 to a control knob 29 supported in a bracket 30 at the bottom of the master arm trunk tube assembly within easy reach of the operator. When the master arm is in any desired position in the X motion, and the operator desires to hold the arm in that position, he need merely push knob 29. Movement is transmitted through the cable 26 to rotate crank arm or lever 25 through a partial turn to actuate the lock box to cause it to grip rod 22.

Similar Y motion lock means are provided by means of a further motion lock box, indicated generally at 19A, whose structure is generally the same as lock box 19. Lock box 19A is pivotally secured to a bracket 31 carried by supporting frame 13. A locking arm or rod 22A extends through lock box 19A for sliding movement with respect to the lock box. One end of locking arm 22A is pivotally secured at 32 to a lug 33 extending out from the side of arm 24 which is mounted for rotary movement with the tubular support 11. The axis of pivot 32 is generally parallel to the axis of master arm pivot 14.

As the master arm is moved about pivot 14, lock box 19A, which is carried by bracket 31, moves relative to locking arm 22A. By actuating lock box 19A, the arm 22A is gripped to prevent further relative motion between the rod and lock box. By this means the operator can hold the master arm in any desired position in the Y motion by actuating crank arm or lever 25A. This is done by means of push-pull cable control 34 which is operated from knob 35 supported in bracket 30 and extends up through bracket 28 and clamp 27A to the lock box. Because the slave arm is secured to the opposite end of tubular support 11 for movement with the master arm in the usual manner, locking the master arm holds the slave arm in corresponding fixed position.

The construction of the lock boxes is shown in detail in FIGURES 2 through 6. As shown, the lock box comprises a cast housing 36 fitted with a cover plate 37. The housing is provided with a boss 38 at each end. A longitudinal channel or passage for locking arm or rod 22 is provided through the bosses and the housing proper. The outer ends of channel 39, where it passes through bosses 38, are enlarged and fitted with bushings 40.

A pair of cavities or chambers 41 are provided in the housing 36 extending transverse to the longitudinal axis of channel 39. As shown in FIGURE 3, the inside surface of cavity 41 is provided with projecting abutments 42 and 43 on the inside of the end walls of the housing on opposite sides of the locking arm passage 39. An abutment 44 is provided on the wall of cavity 41 opposite and outward from abutment 43.

A canting plate 45 is positioned in each of cavities 41. Each plate 45 is provided with a hole 46 through which locking arm or rod 22 may pass with a close slide fit. Arm or rod 22 is passed through bushings 40, channel 39 and holes 46 and is thus positioned for reciprocating motion relative to the lock box. The canting plates 45, in normal position within cavity 41, each rest with one face abutting against the abutments 42 and 43 and the opposite face abutting against abutment 44 on the opposite side of the cavity.

The surfaces of abutments 42 and 43 on the one hand and abutment 44 on the other lie in spaced apart parallel planes separated by the thickness of plate 45. The abutments insure proper alignment of the plates to prevent locking or binding in their normal position. The plates 45 are maintained in this normal position perpendicular to the longitudinal axis of locking arm 22 by means of a cam 47 whose edges bear against the inner faces of plates 45. With the canting plate 45 held in this normal position by means of the cam 47 the locking arm 22 is free to move longitudinally relative to the lock box.

Each of the bosses 38 is provided with a longitudinal channel 48 which extends into cavity 41 spaced from and generally parallel to locking arm passage 39. A compression coil spring 49 is fitted into each channel 48 and compressed and maintained compressed by means of a transverse pin 50 extending across the channel. Thus, each spring 49 exerts force upon one side of a plate 45 and would dislodge the plate from its normal position were it not for the restraining force of cam 47 upon the opposite face of the plate.

Cam 47 is positioned in a cavity 51 in the housing 36 disposed between and communicating with cavities 41 on the same side of locking arm channel 39 as spring channels 48. The cam operating faces 52 are generally arcuate and extend out from cavity 51 into cavity 41 when the cam is in normal position. The cam is provided with flat faces 53 between the arcuate faces. These flat faces lie retracted within cavity 51 when the cam is in locking position.

When the cam 47 is rotated to retract the curved faces into cavity 51 from the canting plate cavities 41, the restraining force of the arcuate cam faces is withdrawn from the plates 45. When this occurs, the compression springs 49 force one end of each plate 45 inwardly away from abutment 42, pivoting on the edge of abutment 43. The opposite face of each plate 45, which normally bears against abutment 44, is moved away from that abutment surface. The result is that the plate 45 is canted with respect to locking arm or rod 22 and hole 46 effectively grips that arm to bind its against further reciprocal longitudinal movement.

The cam 47 includes a hub 54 by which it is attached to a shaft 55 and fixed thereto by means of a pin 56. Shaft 55 is journalled in a pair of bushings 57 and 58 which are supported in the face plate 37 and a recess 59 in the back wall of housing 36, respectively. The outer end of shaft 55 extends through face plate 37 and a crank arm or lever 25 is secured thereto by means of a set screw 60. Movement of arm or lever 25 causes rotation of shaft 55 in order to move cam 47 into and out of locking position.

The free end of arm or lever 25 is provided with clamping means 61 for securing the end of the inner movable element a control cable for operation of the arm or lever. A further clamping means 27 is atached to the face plate of the lock box for the purpose of securing the outer sheath of the control cable spaced from the end of the arm or lever in order to permit relative movement between the inner and outer elements of the push-pull control cable.

In order to avoid unintentional binding between the lock box and the locking arm or rod when the lock box is in its normal open or non-locking position, the lock box assembly is mounted for pivotal and slight rocking movement during the normal operating movements of the manipulator. A mounting bracket or plate 62, provided with means for attaching it to the appropriate part of the manipulator structure, is provided with a stub shaft 63. Shaft 63 extends into an opening or passage 64 through lock box housing 36. Shaft 63 is disposed with its longitudinal axis generally parallel to the axis of shaft 55 and on the opposite side of locking arm or rod 22.

The free end of stub shaft 63 is fitted with a convex bearing member 65 held in place by means of a washer 66 and screw 67. The convex bearing member 65 is journalled in a concave bushing 68 seated on a shoulder in the passage 64 and held in place by means of a tubular sleeve 69 which in turn is held in place by the face plate 37. An opening 70 in the face plate provides access to screw 67 for mounting of the lock box on the stub shaft.

The lock box may rotate about the axis of shaft 63 to accommodate itself to varying angles of the locking arms or rods 22 relative to the arm 24 to which they are secured and the lock boxes may rock slightly about the ball joint so as to prevent binding which might interfere with the normal operation of the manipulator. The master arm of the manipulator may thus be moved freely through its motions in the usual manner without interference by the lock boxes.

However, when the operator desires to freeze the position of the manipulator in either its X motion or Y motion or both, he need merely manipulate the control knobs 29 and 35. The movement of the knobs is transmitted through the control cables to actuate the crank arm or levers. Shaft 55 and cam 47 are rotated a partial turn to retract the arcuate cam edges 52 into the cavity 51.

Simultaneously with the removal of the restraining force of the arcuate cam edges, the spring pressure of coil springs 49 against the plates 45 cause them to be canted relative to the locking arm or rod 22. When plates 45 are thus canted, the locking arm is immediately and positively locked against further longitudinal reciprocating movement relative to the lock box and the manipulator arms are held in the position they occupied at the instant of locking.

Both locking arm 22 and plates 45 are formed from hard wear resistant steel and, to avoid scoring of the locking arm by the plates, the arm is desirably at least as hard as the plates.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A remote control master-slave manipulator comprising a horizontal rotatable tubular support and a master arm and slave arm pivotally supported thereby,
   (a) said tubular support being adapted to extend through a barrier wall and said arms adapted to be supported on opposite sides of that wall,
   (b) said arms being attached to said tubular support to pivot therewith in one direction and relative thereto in another direction;
   (c) motion lock means to lock said arms against pivotal movement in at least one of said directions;
   (d) said motion lock means including a lock box and an elongated locking arm extending through said lock box and being reciprocably movable with respect thereto;
   (e) one of said lock box and said locking arm of each of said motion lock means being mounted for movement with said master arm and the other being mounted independent of movement with said master arm, whereby when said master arm is pivoted said locking arm is reciprocated relative to said lock box;
   (f) said lock box including a plate having an aperture through which said locking arm extends with a slide fit when the axis of said aperture is aligned with the longitudinal axis of said locking arm,
   (g) rotatable cam means in said lock box normally bearing against one face of said plate to maintain the axes of said locking arm and aperture in alignment, and
   (h) means to cant said plate relative to said locking arm when said cam is rotated to cause the apertured plate to grip the locking arm and lock it against further movement.

2. A manipulator according to claim 1 further characterized in that said lock box includes,
   (a) a housing having a longitudinal passage therethrough for movement of said elongated locking arm,
   (b) a transverse cavity extending across said passage,
   (c) said plate contained in said cavity,
   (d) a further cavity communicating with said first cavity,
   (e) said cam means contained in said further cavity,
   (f) one face of said cam means normally extending from said further cavity into said first cavity against said plate and being retractable into said further cavity upon rotation of said cam means,
   (g) resilient pressure means exerting force against said plate against the resistance of said cam face, and
   (h) means controllable by the manipulator operator to actuate rotation of said cam means.

3. A manipulator according to claim 2 further characterized in that
   (a) said cam means is carried on a shaft journalled in said housing
   (b) one end of said shaft is fitted with a control lever to rotate said shaft upon movement of the lever,
   (c) one end of a push-pull control cable is secured to said control lever, and
   (d) the opposite end of said control cable is secured to the operator's end of said master arm and provided with a control knob to effect movement of the cable and control lever.

4. A manipulator according to claim 2 further characterized in that said lock box housing includes
   (a) a pair of transverse cavities extending across the longitudinal passage for movement of said elongated locking arm,
   (b) an apertured plate contained in each of said cavities,
   (c) said further cavity lying between said pair of transverse cavities and in communication with both,
   (d) said cam means normally extending into both of said transverse cavities against both of said plates,
   (e) said plates being cantable in opposite directions, and
   (f) resilient pressure means exerting force against both of said plates.

5. A manipulator according to claim 1 further characterized in that
   (a) said arms are adapted to be locked against pivotal movement with said tubular support,
   (b) said lock box is adapted to be mounted on said barrier wall, and
   (c) one end of said locking arm is pivotally mounted on said tubular support for longitudinal movement of the locking arm relative to said lock box in response to movement of said tubular support.

6. A manipulator according to claim 1 further characterized in that
   (a) said arms are adapted to be locked against pivotal movement relative to said tubular support,
   (b) said lock box is mounted on said master arm for movement therewith, and
   (c) one end of said locking arm is pivotally mounted on said tubular support for longitudinal movement of the locking arm relative to said lock box in response to movement of said master arm about its pivotal connection to said tubular support.

7. A manipulator according to claim 1 further characterized in that
   (a) said arms are adapted to be locked against pivotal movement both with said tubular support and relative to said tubular support,
   (b) one lock box is adapted to be mounted on said barrier wall to be stationary relative to rotation of said tubular support end,
   (c) another lock box is mounted on said master arm for movement therewith,
   (d) one end of one locking arm is pivotally mounted on said tubular support for longitudinal movement of the locking arm relative to said first lock box in response to rotation of said tubular support, and
   (e) one end of another locking arm is pivotally mounted on said tubular support for longitudinal movement of that locking arm relative to said other lock box in response to movement of said master arm about its pivotal connection to said tubular support.

References Cited by the Examiner
UNITED STATES PATENTS 2,771,199  11/1956  Jelatis _____ 214—1
3,139,990  7/1964   Jelatis et al. _____ 214—1

GERALD M. FORLENZA, *Primary Examiner.*

R. G. SHERIDAN, *Assistant Examiner.*